United States Patent [19]

Skelcey et al.

[11] 3,852,497

[45] Dec. 3, 1974

[54] CEREAL PRODUCTS CONTAINING MAGNESIUM COMPOUNDS AS NUTRITIONAL SUPPLEMENTS

[75] Inventors: James S. Skelcey; David W. Richards; Alan M. Hart, all of Midland, Mich.

[73] Assignee: The Dow Chemical Company, Midland, Mich.

[22] Filed: Mar. 5, 1973

[21] Appl. No.: 337,862

[52] U.S. Cl.............. 426/74, 426/26, 426/141, 426/142, 426/148, 426/152, 426/153
[51] Int. Cl............................ A23l 1/30, A21d 2/02
[58] Field of Search........... 426/70, 72, 74, 73, 208, 426/93, 96, 97, 141, 142, 145, 148, 152, 355, 375

[56] References Cited
UNITED STATES PATENTS

| | | | |
|---|---|---|---|
| 2,295,643 | 9/1942 | Emery et al. | 426/74 |
| 3,443,956 | 5/1969 | Muller et al. | 426/74 |

Primary Examiner—Raymond N. Jones
Attorney, Agent, or Firm—Theodore Post; C. Kenneth Bjork

[57] ABSTRACT

Magnesium deficiency is reduced or prevented by providing cereal-containing foods and baked goods fortified with a minor amount of a magnesium phosphate, magnesium pyrophosphate, magnesium potassium phosphate or a calcined magnesium oxide.

7 Claims, No Drawings

CEREAL PRODUCTS CONTAINING MAGNESIUM COMPOUNDS AS NUTRITIONAL SUPPLEMENTS

BACKGROUND OF THE INVENTION

It is well known that magnesium is an essential element for the normal functioning of the human organism. Since cereal-containing foods and baked goods such as, for example, bread, muffins, biscuits, cakes, processed grains, grain flours and breakfast cereals comprise a substantial portion of the diet of nearly all peoples, these and other cereal-containing foodstuffs are potentially highly effective vehicles for reducing or preventing a magnesium deficiency.

Many magnesium compounds, however, are unsuitable additives for cereal-containing foodstuffs. The addition of nutritionally significant amounts of the hydrates of magnesium sulfate and of magnesium chloride to flour, for example, can impart a bitter taste to bread prepared therefrom, while attempts to employ magnesium oxide calcined below 700°C., magnesium hydroxide, and magnesium carbonate as supplements to baked cereal goods have failed because the additives cause an offensive odor in the baked products. Such adverse effects render products containing such magnesium additives unattractive to the consumer and hence the additives are unsuitable as potential nutritional supplements.

BRIEF SUMMARY OF THE INVENTION

It has now been discovered that magnesium phosphates such as, for example, anhydrous magnesium phosphate, the tetrahydrate and octahydrate magnesium phosphates, the anhydrous, trihydrate and heptahydrate magnesium hydrogen phosphates, the monohydrate and hexahydrate magnesium potassium phosphates, the anhydrous and trihydrate magnesium pyrophosphates and calcined magnesium oxide or a mixture thereof can be added to cereal grains, flours and foodstuffs prepared therefrom in significant amounts without the undesirable taste and odor disadvantages associated with other magnesium salts. The present invention is thus directed to grains, particularly coarsely ground grains and flours therefrom and cereal-containing foodstuffs fortified with a significant amount of such a magnesium compound or a mixture thereof.

DESCRIPTION OF SOME PREFERRED EMBODIMENTS

In the practice of this invention, a calcined magnesium oxide, a magnesium phosphate, a magnesium potassium phosphate, a magnesium pyrophosphate or a mixture thereof, as indicated above, is added with mixing at any convenient stage in the preparation of the cereal-containing foodstuffs. Three preferred salts are magnesium phosphate tetrahydrate, $Mg_3(PO_4)_2 \cdot 4H_2O$, magnesium hydrogen phosphate trihydrate, $MgHPO_4 \cdot 3H_2O$, and anhydrous magnesium pyrophosphate, $Mg_2P_2O_7$. The magnesium oxide employed is a magnesium oxide which has been calcined at a temperature between about 700°C. and about 1,700°C. for about 1 to about 12 hours. Best results are obtained with magnesium oxide calcined above 1,100°C.

Methods for the preparation of magnesium phosphates, magnesium pyrophosphates, magnesium potassium phosphates, and magnesium oxides are well known to those skilled in the art. The methods used are those which utilize starting materials and procedures adequate to give food grade materials. The magnesium compounds disclosed above are subdivided by grinding, micropulverizing or the like to give a particulate product, advantageously having a particle size of about —325 U.S. mesh prior to use.

In the fortification of a cereal grain or a cereal-containing foodstuff with such a magnesium compound, a significant amount, i.e., a total of from about 0.02 to about 0.5 weight percent, cereal basis, of one or more of the magnesium compounds disclosed above is added to the cereal grain or cereal-containing foodstuff in any convenient fashion. In the case of baked goods, such as chemically or biologically leavened products including bread, rolls, muffins, cakes, biscuits, etc., the magnesium compound is conveniently added to the cereal flour from which the baked goods are prepared. In the case of whole grain, cracked or rolled grain products, such as processed breakfast cereals, the compound can be added either during or after processing.

Example 1

Three loaves of white bread are baked according to a conventional home-made bread recipe. To the ingredients for loaf A, containing 411.3 grams of flour, are added 4.08 grams of particulate magnesium hydrogen phosphate trihydrate. Similarly, 2.64 grams of particulate magnesium phosphate tetrahydrate are added to the ingredients for loaf B, containing 413 grams of flour. These quantities result in a magnesium ion fortification of approximately 615 to 635 milligrams per pound of flour. The third loaf is a control with no magnesium additive. The following day the three bread samples are evaluated for taste, smell, texture, appearance and aftertaste by a consumer panel of twenty persons. The consensus of the panel is that there are no significant differences in the above characteristics of the bread; all agree that the bread with the magnesium phosphate additive is just as palatable as the control bread.

Example 2

Test loaves of white bread are baked according to a commercial bread recipe. For each recipe, an amount of 1.25 grams of —325 U.S. mesh magnesium oxide per 1000 grams of flour, ca. 200 mg. of magnesium per pound of baked bread, is added. In the first recipe, the magnesium oxide is one which has been calcined at 1,500°C. for 2 hours. In the second recipe, the magnesium oxide is one which has been calcined at 1,700°C. for one hour. The third recipe is a control containing no added magnesium oxide. Eighteen hours after baking, a consumer test panel evaluation is that there are slight to no significant differences in flavor, smell, texture, appearance and aftertaste of the three breads.

Example 3

Ready to eat flaked breakfast cereals having a basis of wheat, oats, corn, rye, bran, rice or mixtures thereof are prepared in usual ways and at any convenient point in their preparation a magnesium phosphate, magnesium potassium phosphate or magnesium oxide as described above in the amount of about 0.02 to about 0.5 weight percent, cereal grain basis, is added with mixing.

Example 4

A fortified flour is prepared by admixing with wheat, corn, rye, oat, potato or white flour or mixtures thereof 0.02 to 0.5 weight percent of a magnesium phosphate, magnesium potassium phosphate, magnesium pyrophosphate or a calcined magnesium oxide or a mixture thereof, as described above.

What is claimed is:

1. A cereal-containing foodstuff which is fortified with about 0.02 to about 0.5 weight percent, cereal basis, of a magnesium compound in particulate form selected from the group consisting of (1) magnesium oxide calcined at about 700°C. to about 1,700°C.; (2) magnesium phosphate, magnesium potassium phosphate, magnesium pyrophosphate, magnesium hydrogen phosphate and hydrates thereof; and (3) mixtures thereof.

2. The fortified cereal-containing foodstuff of claim 1 wherein the foodstuff is baked.

3. The fortified cereal-containing foodstuff of claim 1 wherein the foodstuff is a cereal flour.

4. The fortified cereal-containing foodstuff of claim 1 wherein the magnesium compound is magnesium hydrogen phosphate trihydrate.

5. The fortified cereal-containing foodstuff of claim 1 wherein the magnesium compound is magnesium phosphate tetrahydrate.

6. The fortified cereal-containing foodstuff of claim 1 wherein the magnesium compound is a calcined magnesium oxide.

7. The fortified cereal-containing foodstuff of claim 1 wherein the magnesium compound is magnesium pyrophosphate.

* * * * *